(12) United States Patent
Lundin

(10) Patent No.: US 6,198,933 B1
(45) Date of Patent: Mar. 6, 2001

(54) COMMUNICATION SYSTEM THAT COMMUNICATES POSITION INFORMATION OF ROAMING MOBILE STATIONS

(75) Inventor: Magnus Lundin, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/852,032

(22) Filed: May 6, 1997

(51) Int. Cl.[7] ....................................................... H04Q 7/20
(52) U.S. Cl. ........................... 455/456; 455/432; 455/466; 455/440
(58) Field of Search ..................................... 455/432, 433, 455/434, 466, 456, 450, 440, 435

(56) References Cited

U.S. PATENT DOCUMENTS

| 5,357,561 | * 10/1994 | Grube | 379/60 |
| 5,432,841 | 7/1995 | Rimer | 379/59 |
| 5,610,974 | 3/1997 | Lantto | 379/59 |
| 5,628,051 | * 5/1997 | Salin | 455/33.1 |
| 5,713,073 | * 1/1998 | Warsta | 455/56.1 |
| 5,819,180 | * 10/1998 | Alperovich et al. | 455/465 |

FOREIGN PATENT DOCUMENTS

| 0 758 835 | 2/1997 | (EP) . |
| WO96/25830 | 8/1996 | (WO) | H04Q/7/38 |
| WO98/00988 | 1/1998 | (WO) | H04Q/7/22 |

OTHER PUBLICATIONS

European Standard Search Report dated Mar. 6, 1998.

* cited by examiner

*Primary Examiner*—Fan Tsang
*Assistant Examiner*—Sheila Smith
(74) *Attorney, Agent, or Firm*—Burns, Doane, Swecker & Mathis, L.L.P.

(57) ABSTRACT

A communication system communicates position request and information over a communication channel that is used for communicating roaming data between mobile stations. Over the communication channel, a first local PLMN transmits a position request to a second remote PLMN covering a remote service area within which a roaming mobile station is positioned. In response to the position request, the second PLMN transmits position information related to the roaming mobile station to the first PLMN, preferably, over the same communication channel.

27 Claims, 4 Drawing Sheets

COMMUNICATION SYSTEM THAT COMMUNICATES POSITION INFORMATION OF ROAMING MOBILE STATIONS

BACKGROUND

This invention generally relates to the field of cellular communication systems and, more particularly, to communicating position information of roaming mobile stations operating at remote service areas.

In today's cellular communication systems, the system operators have adopted communication protocols that allow them to offer various communication services while maintaining compatibility with services offered by other operators. One communication technology that is widely adopted is a Global Standard for Mobilecommunication, also known as the GSM standard or GSM. The GSM standard defines a radio communication protocol for a corresponding Public Land Mobile Network (PLMN) which is intended to provide local and roaming subscribers system access without compatibility problems.

The GSM is designed to support various communication services. For example, one of the communication services supported by the GSM protocol is a short messaging service (SMS) that allows system subscribers to communicate text messages with each other, over GSM signalling control channels. Because of increased sophistication in the services offered, some communication services now rely on position information that accurately characterize the coordinates of mobile stations within a service area. For example, position information is needed for fleet management of trucks and containers, preventing car thefts, locating rented cars and routing emergency calls. Generally, a PLMN that offers this type of service incorporates a Cellular Positioning System (CPS) that relates mobile stations' position information to a service requester when a position request is received. To provide the position information, the CPS includes a mobile positioning center (MPC) that initiates a positioning procedure to locate the mobile station in response to the position request.

It is customary for the MPC to transmit the position information to the service requester in absolute terms. Generally, however, the position information generated by the positioning procedure is in relative terms. To convert the relative coordinates into absolute coordinates, each MPC uses a distributed database consisting of a conversion table. Because the databases are distributed, each operator controls and administers its own database independent of other operators. As a result, the conversion from relative to absolute coordinates is performed by an MPC that covers the service area of a PLMN within which the mobile stations operate.

Conventional systems use a local MPC to initiate the positioning procedure for determining the relative coordinates of a mobile station travelling within a local service area. In a roaming situation, when the mobile station travels outside its local service area and into a remote service area covered by a remote PLMN, the local MPC may not be used for providing the position information of a roaming mobile station. Rather, the position request must be routed to the remote PLMN, which is usually operated by another operator. In response to the routed position request, a remote MPC can then initiate a positioning procedure for determining the position information of the roaming mobile station. Once determined, the position information must be routed back to the local MPC to be provided to the service requester.

Conventional techniques for handling communication with roaming mobile stations use a GSM Mobile Application Part (MAP) and/or other protocol that is based on a European standard known as CCIT No. 7. This protocol does not support the communication of position requests and location information between inter-networked PLMNs. Adding such communication capability to the existing GSM protocol is complicated and is likely to produce various compatibility issues with existing systems. Therefore, there is a need for a simple way of communicating position request and information between inter-networked LMPNs for roaming mobile stations in remote service areas, without compromising system compatibility.

SUMMARY

The present invention that addresses this need is exemplified in a communication system that communicates position requests and location information over a communication channel that is used for communicating roaming data between mobile stations. Over the communication channel, which according to an exemplary embodiment of the invention may be a communication channel used for a short messaging service offered by the system, a first local PLMN transmits a position request to a second remote PLMN covering the service area within which a roaming mobile station is positioned. In response to the position request, the second PLMN transmits position information related to the roaming mobile station to the first PLMN, preferably, over the same communication channel used for transmitting the position request.

According to more detailed features of the invention the first PLMN transmits the position request based on information contained in a home location register (HLR) associated with the roaming mobile station. The HLR contains an address for a visiting location register (VLR) that is an address in the second PLMN.

According to another aspect of the invention, a communication system that supports roaming among at least two PLMNs includes a first Mobile Positioning Center (MPC) located in a first PLMN that transmits a position request over a communication channel. A second MPC located in a second PLMN is responsive to receiving the position request over the communication channel to initiate a positioning procedure for determining the position of the roaming mobile station.

According to a method for communicating position information in a communication network a position request is transmitted from a first PLMN to a second PLMN. The position request is transmitted over a communication channel which is used for communicating between PLMNs that support positioning services. In response to the position request, the method of the invention transmits position information related to a roaming mobile station to the first PLMN.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
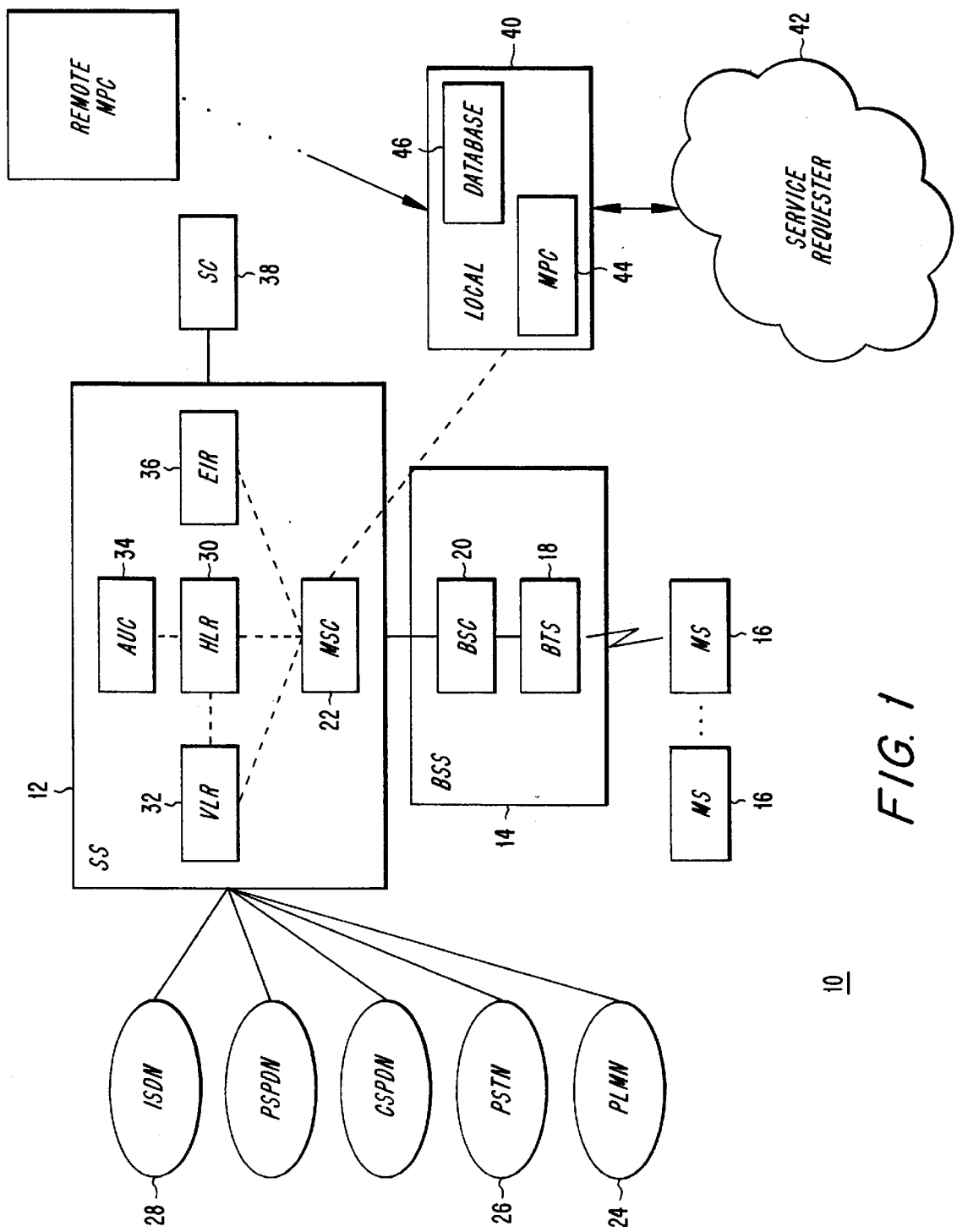
FIG. 1 is a block diagram of a communication system that can advantageously incorporate the present invention.

Referring to FIG. 1, a block diagram of a communication system 10 that can advantageously use the present invention is shown. In an exemplary embodiment, the communication system operates according to the Pan-European Digital Cellular System's GSM standard, however, those skilled in the art will appreciate that the present invention is equally applicable to systems defined by other standards, e.g., DAMPs or PDC. The mode of operation of the GSM communication systems is described at least partly in European Telecommunication Standard Institute (ETSI) documents ETS 300 573, ETS 300 574 and ETS 300 578, which are hereby incorporated by reference. Therefore, the operation of the system is described herein only to the extent necessary for understanding of the present invention.

The communication system 10 is operated by a PLMN operator that offers various communication services to subscribers within its local service area and those roaming from remote service areas covered by one or more remote PLMN operators. The communication system 10 is basically divided into two major blocks: a Switching System (SS) block 12 and a Base Station System (BSS) block 14. The BSS block 14 includes one or more mobile stations 16 that are used by the subscribers for communicating voice and data messages over GSM specified signalling and traffic communication channels. The mobile stations 16 communicate the messages with a Base Transceiver Station (BTS) 18 over one or more radio frequency (RF) communication channels that are in compliance with a predefined air interface protocol. The BTS 18, which serves an assigned communication cell, contains a radio transceiver (not shown) that provides communication over the RF channels, and a digital signal processor (not shown) that processes the communicated messages to and from the mobile stations 16. A well known Base Station Controller (BSC) 20 controls and supervises one or more BTSs 18 and the allocation of the RF channels within the system 10.

The SS block 12 includes a Mobile Switching Center (MSC) 22 that controls one or more BSCs 20. The MSC 22 also acts as an interface with various external networks, including a remote PLMN 24, a Public Switched Telephone Network (PSTN) 26, an Integrated Services Digital Network (IDSN) 28, etc. The MSC 22 is responsible for set-up, routing and supervision of calls to and from the mobile stations 16. The SS block 12 includes a Home Location Register (HLR) 30 that is a database with information about all mobile stations 16 that belong to the local PLMN. This database, which can be implemented in one or more HLRs, stores various information about the mobile stations 16, including their locations and their required services. A Visitor Location Register (VLR) 32, which in an exemplary embodiment may be implemented in the same switch as the MSC 32, contains non-permanent information about roaming mobile stations visiting the service area covered by the local PLMN. The roaming mobile stations 16 continuously update their VLR address in their corresponding HLR 30. In this way, the communication system 10 can appropriately route calls directed to roaming mobile stations 16. The SS block 12 includes an Authentication Center (AUC) 34 that authenticates each subscriber's access and ciphers speech, data and signalling information, for security purposes. Also included in the SS block 12 is an Equipment Identity Register (EIR) 36 that prevents a stolen or non-type-approved mobile station from operating within the system.

A Short Message Center (SC) block 38 handles a short message service (SMS) provided by the local operator. The SC block 38 is responsible for reading, storing and forwarding SMS messages between a SMS message sender and receiver. Unlike voice or data which are communicated over traffic channels, the SMS messages are typically transmitted as signalling information on signalling channels defined by the GSM standard. Under this service, if a mobile station 16 is switched off, or otherwise unreachable, the SMS message is stored and can later be sent to the designated mobile station when that mobile station is reconnected to the system. When the SMS message is delivered from the SC block 38 to a mobile station 16, such a message is conventionally referred to as a "mobile terminated short message" (MTSM). If an SMS message originates at a mobile station 16, the signal to the SC block 38 requesting forwarding of the SMS message is conventionally referred to as a "mobile originated short message" (MOSM). The conventional protocols for transmission of MTSM and MOSM are well defined by the GSM standard, for example in the document entitled "GSM 09.02-Version 2" published in June 1992 which is incorporated here by reference.

As described later in detail, the communication system incorporates a cellular positioning system (CPS) block 40 that handles the position request and routing of position information between local and roaming mobile stations and a service requester 42. The CPS includes an MPC 44 that initiates a positioning procedure in response to a position request received from a service requester 42, such as a mobile station, locally or remotely from another PLMN. As described before, the CPS block 40 also includes a database 46 for converting the relative coordinates of a mobile station 16 operating within the service area of the system 10 into absolute coordinates as required by the service requester 42. Instead of converting, the database 46 can store and use absolute coordinates directly.

Figure 2:
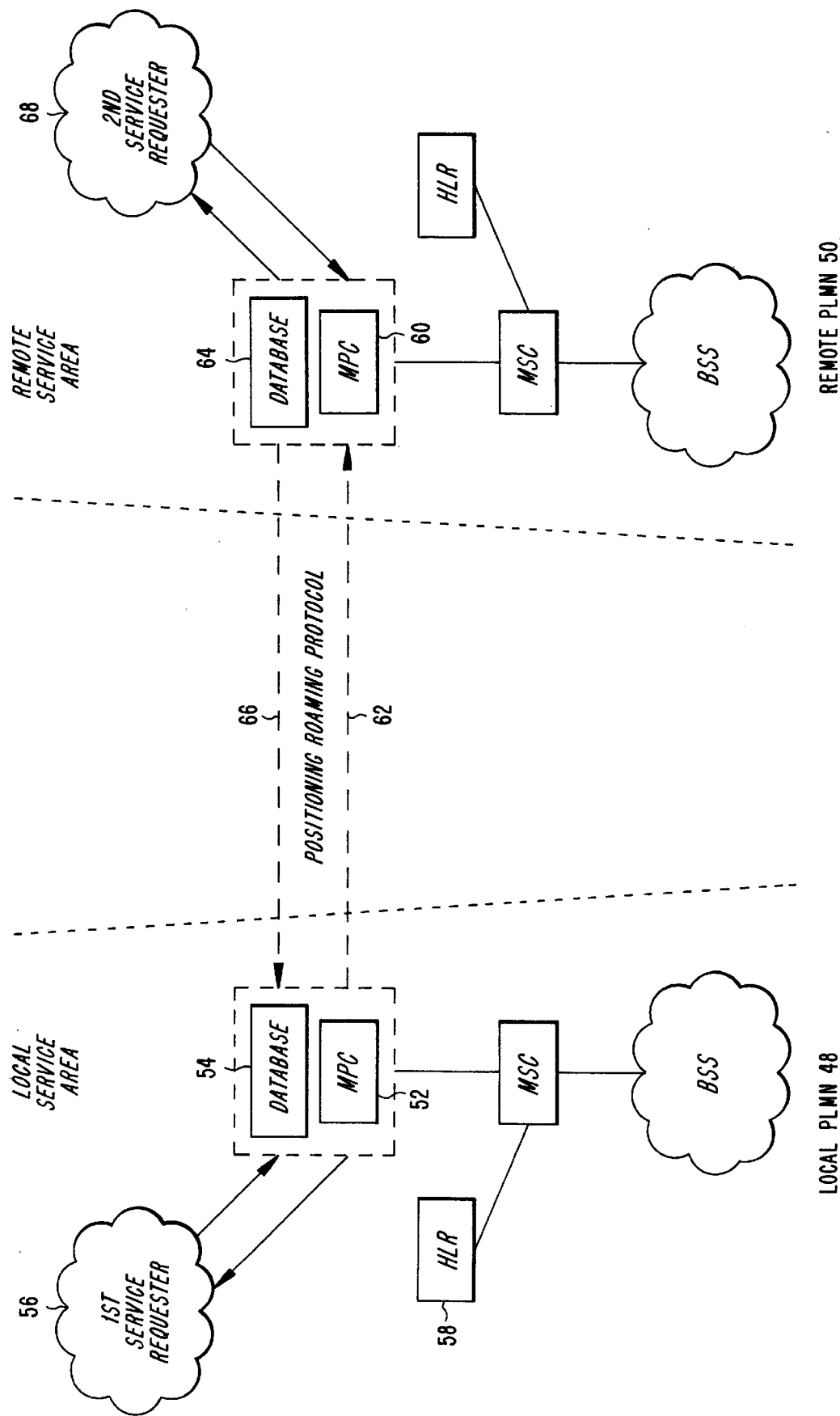
FIG. 2 is a block diagram of a local public land mobile network and a remote public land mobile network that communicate positioning request and information according to the present invention.

According to the present invention, a cellular communication system communicates position information of roaming mobile stations between at least two PLMNs using a communication channel that supports protocol used to transport roaming data to a specified destination. Referring to FIG. 2, a local PMLN 48 and a remote PLMN 50 are shown that communicate position request and information according to the present invention. The local and remote PLMNs 48 and 50 are each a communication system substantially configured according to the communication system 10 of FIG. 1. For simplicity, FIG. 2 only shows the relevant blocks of the local and remote PMLNs 48 and 50. As shown, the system of the invention transmits a position request from the local PLMN 48 covering a local service area to the remote PLMN 50 covering a remote service area. The local PLMN 48 includes a local MPC 52 that interfaces with a local database 54 for converting relative coordinates to absolute coordinates. In response to a position request generated from a first service requester 56, which wishes to locate a designated mobile station, the local MPS 52 initiates a positioning procedure to locate the mobile station 16. As described later in detail, the system in which the designated mobile station is operating is located by interrogating a local HLR 58 that provides routing information that specify the system address. If the mobile station 16 operates within the local coverage area, a local positioning procedure will produce relative coordinates, which are converted to absolute coordinates via the local database 54. Otherwise, the local MPC 52 transmits the position request to a remote MPC 60 included in the remote PLMN 50, which is specified by the routing information as the network covering the remote service area within which the designated mobile station 16 operates. A dotted line 62 shows the communication channel for communicating the positioning request from the local PMLN 48 to the remote PLMN 50. In response to the position request, the remote MPC 60 initiates a remote positioning procedure, to determine the relative coordinates of the designated roaming mobile station. The positioning procedure may be one of well known GPS or CPS based procedures. As described before, if necessary, a remote distributed database 64 converts the relative coordinate to absolute coordinates. As shown by a dotted line 66, the remote MPC 60 then transmits the absolute position information to the local MPC 52 over the communication channel according to the present invention. Once the position information is received, the local MPC 52 delivers it to the first service requester 56. It will be appreciated that the communication system of the invention handles a position request from a second service requester 68 from the remote PMLN 50 in a similar manner as that was described in connection with the service request from which the first service requester 56.

The present invention uses a positioning roaming protocol (PRP) for supporting inter-networking roaming in a system that offers positioning services. In an exemplary embodiment, the PRP may be embedded on a level 2/3 protocol of an open information (OSI) network having a signalling protocol with defined real-time performance. The PRP is used on a channel for transmitting roaming data to a mobile station. One channel that may be used is a GSM defined signalling channel that is used for communicating signalling information related to a roaming mobile station. In this way, the PRP does not depend on underlying routing and transportation protocols, for example, the GSM SCCP, for supporting the communication of position request and information. Preferably, the PRP can use already existing layer protocols for this purpose, such as MTP/SCCP, IP based, frame relay, X25, or ATM protocols. It should be noted that the underlying protocol of the PRP is selected such that the amount of delay associated with communicating the position request and information is within an acceptable range.

In one preferred embodiment, the short messaging protocols are used for communicating the position request and information. Under this embodiment, the position request may be formatted as an MOSM message and the position information may be transmitted using the MTSM format. According to another aspect of the invention, other communication channels, such as GSM defined control subchannels that are embedded within traffic channels may also be used for communicating position request and information.

Figure 3:
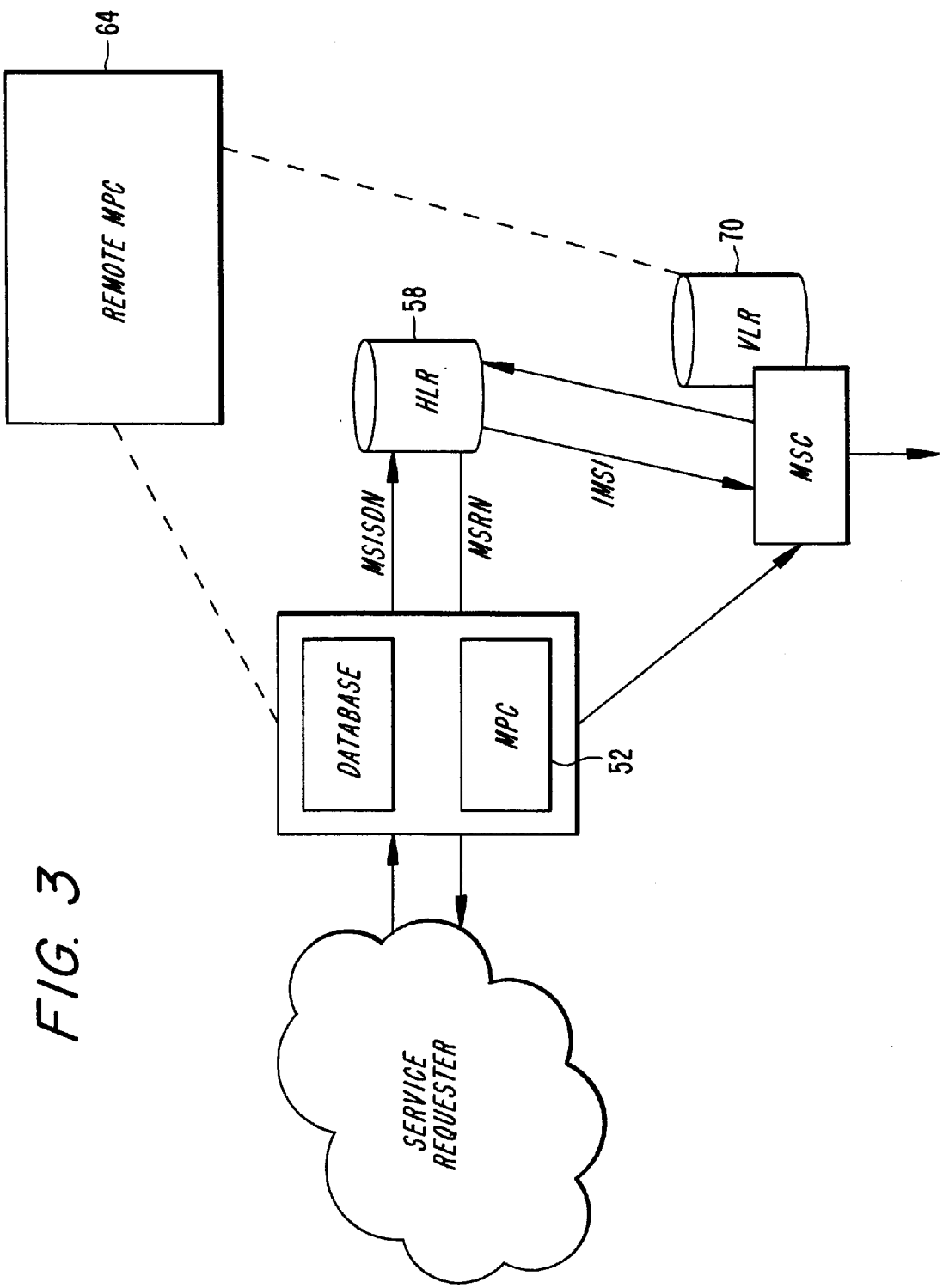
FIG. 3 is a block diagram of a cellular positioning system according to the present invention.

Referring to FIG. 3, a block diagram of a cellular positioning system is shown. For locating the remote PLMN that covers the remote service area within which the roaming mobile station operates, the local PLMN 48 interrogates the local HLR 58, which stores routing information of the subscribers including, for example, current location of the subscribers' mobile stations, directory number (MSISDN), radio number plan identification (e.g., International Mobile Subscriber Identity (IMSI)), supplementary service profiles and teleservice profiles. Upon request, the local HLR 58 provides the routing information for a remote MSC that is responsible for handling calls for the designated roaming mobile station. After receiving the routing information, e.g., the remote MSC number and IMSI, from HLR, the local PLMN 48 forwards the position request to the remote PLMN 50 which is currently serving the roaming mobile station using the PRP protocol according to the present invention.

The routing information for a roaming mobile station includes an address to a remote VLR 70, which manages data associated with roaming mobile stations operating in the remote service area. As described before, the VLR 70 is constantly updated with information from a mobile station's local HLR 58. Accordingly, the system 10 transmits the position request based on information contained in an HLR that is associated with the roaming mobile station. In response to receiving the position request according to the indication, the remote MPC 64 initiates the remote positioning procedure for locating the roaming mobile station 16. The position information is then returned to the local MPC 54 over the communication channel of the present invention.

Figure 4:
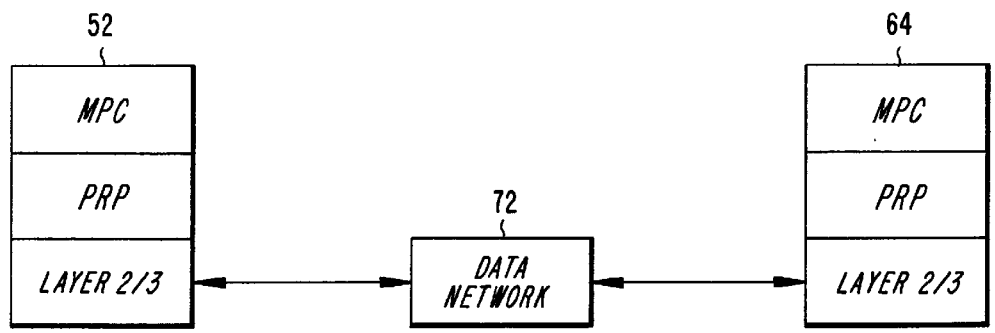
FIG. 4 is a diagram of an exemplary communication protocol for communicating position request and information according to one embodiment of the invention.

As shown in FIG. 4, the routing of the position request is carried out in a data network 72, such as a network defined based on internet technology. If a GSM defined ISDN addressing is used, such as one according to the ITU/CCTT recommendation E. 164, a conversion table is implemented in the system that performs a conversion between the VLR address and a data address (layer 2/3) identifying the location of the remote MPC 64 for routing the position request. In this way, the MPC 64 may include a database containing geographical information, for example, information about the location of all BTSs in the system. This information together with the relative information (e.g., location number, or a number designating a geographical area, as specified by the network operator) retrieved from the network gives an absolute geographical position. The use of the PRP protocol also makes it possible to specify intelligent procedure that makes the operation of the system easier. For example, an automatic updating of conversion information between the local and remote MPCs 52 and 64 may be performed using this protocol.

Figure 5:
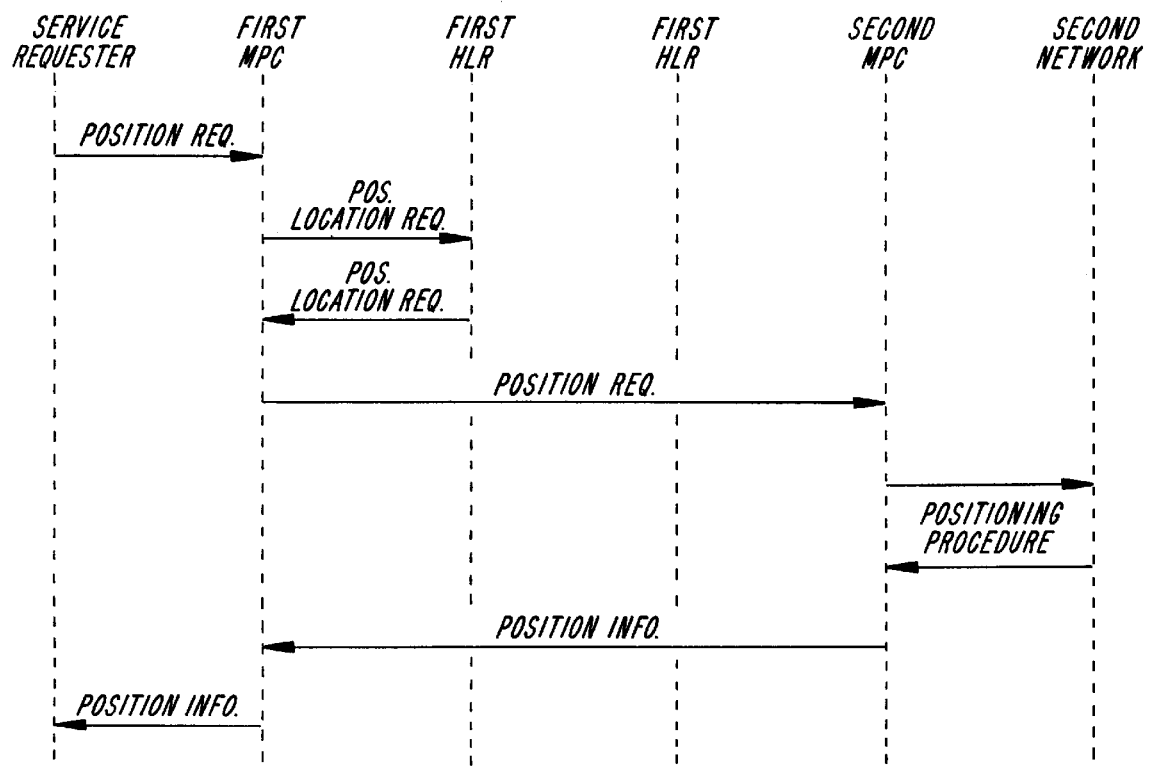
FIG. 5 is a message diagram for a method of communicating position request and information according to the invention.

Referring to FIG. 5, a message diagram for a method of communicating positioning requests and information according to the present invention is shown. According to the method, a service requester initiates a position request to a first MPC. The first MPC request routing information from a first HLR, which the mobile station in question belongs to. Then, the first HLR provides a position location response that contains the VLR address of the mobile station's current cell. When the first MPC receives the VLR address, it determines whether or not the VLR address belongs to its own network. If not, a conversion between the VLR address and data network address is performed. If the VLR address does not belong to the network, the first MPC forwards the position request to a second data network specified by the VLR address, which is used to route the position request to a second MPC. The second MPC initiates a positioning procedure and receives position information of the mobile station from the second network. A conversion between relative to absolute coordinance is performed by the second MPC before transmitting the position information back to the first MPC by using the PRP protocol. When the position information is received, the first MPC validates the information in order to determine existence of error. If the positioning procedure has been carried out without any error, the first MPC routes the position information to the service requester.

From the foregoing description it will be appreciated that the present invention allows a simple way for integration of a positioning service in a GSM system. Its supports distributed database that facilitate the determination of absolute coordinance of the mobile stations. The present invention also allows the operator to tailor the underlying protocol according to a particular system requirement. The present invention does not depend on the evolution of the GSM MAP, for supporting the positioning service in the GSM service. Therefore, the positioning service may be implemented expediently as an active part of the total GSM infostructure, without influencing the already existing services.

What is claimed is:

1. A communication system that supports roaming among at least two PLMNS, comprising:
    a first Mobile Positioning Center (MPC) located in a first PLMN that transmits a position request over a communication channel requesting position information of a roaming mobile station; and
    a second MPC located in a second PLMN that in response to receiving the position request over the communication channel initiates a positioning procedure for determining the position of the roaming mobile station.

2. The communication system of claim 1, wherein the second MPC transmits the position information of the roaming mobile station to the first MPC.

3. The communication system of claim 1, wherein the position request is transmitted over a communication channel used for communicating roaming data between the mobile stations.

4. The communication system of claim 3, wherein the position information is transmitted over the communication channel used for communicating roaming data between the mobile stations.

5. The communication system of claim 3, wherein the communication channel is used for a short messaging service.

6. The communication system of claim 1, wherein the first MPC transmits the position request based on information contained in a home location register (HLR) associated with the roaming mobile station.

7. The communication system of claim 6, wherein the HLR contains an address for a visiting location register (VLR).

8. The communication system of claim 7, wherein the address of the VLR is an address pointing to the second PLMN.

9. A cellular positioning system for a communication network that supports roaming among a first PLMN and a second PLMN, comprising:
    a first mobile positioning center (MPC) located in the first PLMN that transmits a position request requesting position information of a roaming mobile station in the second PLMN; and
    a second MPC located in the second PLMN that in response to receiving the position request initiates a positioning procedure for determining the position of the roaming mobile station, wherein the second MPC transmits the position information of the roaming mobile station to the first MPC.

10. The cellular positioning system of claim 9, wherein the first MPC transmits the positioning request over a communication channel used for communicating roaming data.

11. The cellular positioning system of claim 10, wherein the communication channel is used for a short messaging service.

12. The cellular positioning system of claim 10, wherein the second MPC transmits the position information over the communication channel used for a short messaging service.

13. The cellular positioning system of claim 9, wherein the first MPC transmits the position request based on information contained in a home location register (HLR) associated with the roaming mobile station.

14. The cellular positioning system of claim 13, wherein the HLR contains an address for a visiting location register (VLR).

15. The cellular positioning system of claim 14, wherein the address of the VLR is an address pointing to the second PLMN.

16. A cellular communication system according to claim 1, wherein the communication channel is layered on top of the Internet Protocol (IP).

17. A cellular communication system according to claim 1, wherein the communication channel is layered on top of the X25 protocol.

18. A cellular communication system according to claim 1, wherein the communication channel is layered on top of the SCCP/MTP protocols.

19. A cellular communication system according to claim 1, wherein the communication channel is layered on top of the ATM protocol.

20. A method for communicating roaming information among at least two PLMNs, comprising:
    transmitting a position request over a communication channel requesting position information of a roaming mobile station from a first Mobile Positioning Center (MPC) located in a first PLMN; and
    receiving the position request over the communication channel at a second MPC located in a second PLMN; and
    initiating a positioning procedure for determining the position of the roaming mobile station.

21. The method of claim 20, wherein the second MPC transmits the position information of the roaming mobile station to the first MPC.

22. The method of claim 20, wherein the position request is transmitted over a communication channel used for communicating roaming data between the mobile stations.

23. The method of claim 22, wherein the position information is transmitted over the communication channel used for communicating roaming data between the mobile stations.

24. The method of claim 22, wherein the communication channel is used for a short messaging service.

25. The method of claim 20, wherein the first MPC transmits the position request based on information contained in a home location register (HLR) associated with the roaming mobile station.

26. The method of claim 25, wherein the HLR contains an address for a visiting location register VLR).

27. The method of claim 26, wherein the address of the VLR is an address pointing to the second PLMN.

* * * * *